(54) MULTIPLE USER ACCESS NETWORK

(75) Inventors: Mowaffak T. Midani, Petaluma; Dieter H. Nattkemper, Rohnert Park; K. Martin Stevenson, III, San Rafael, all of CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/066,611

(22) Filed: Apr. 24, 1998

Related U.S. Application Data

(60) Provisional application No. 60/045,100, filed on Apr. 25, 1997.

(51) Int. Cl.[7] .................................. H04J 3/16; H04J 3/22
(52) U.S. Cl. .......................... 370/466; 370/397; 370/399; 370/473
(58) Field of Search ................................ 370/389, 392, 370/393, 395, 396, 398, 400, 401, 442, 397, 399, 465, 466, 470, 471, 472, 473

(56) References Cited

U.S. PATENT DOCUMENTS

| | | | |
|---|---|---|---|
| 5,490,140 | * 2/1996 | Abensour et al. | 370/352 |
| 5,528,590 | * 6/1996 | Lidaka et al. | 370/395 |
| 5,561,669 | * 10/1996 | Lenney et al. | 370/352 |
| 5,619,504 | * 4/1997 | Van Grinsven et al. | 370/347 |
| 5,724,513 | * 3/1998 | Ben-Nun et al. | 709/234 |
| 5,946,313 | * 8/1999 | Allan et al. | 370/397 |
| 5,991,308 | 11/1999 | Fuhrmann et al. | |

* cited by examiner

Primary Examiner—Ajit Patel
Assistant Examiner—Bob A. Phunkulh
(74) Attorney, Agent, or Firm—Jackson Walker L.L.P.

(57) ABSTRACT

A multiple user access network (10) includes a master network element device (12) and multiple slave network termination devices (14a–14n). The network element device (12) couples to the multiple network termination devices (14a–14n) in a multi-user network interface (MUNI) topology by a shared media link (16). Each network termination device (14a–14n) is assigned its own unique group ID address (38) by the master network element device (12). The network element device (12) sends MUNI asynchronous transfer mode cells (30, 32) to appropriate network termination devices (14a–14n) over shared media link (16). The group ID (38) field is also defined to allow for the network element device (12) to broadcast asynchronous transfer mode cells to all the network termination devices (14a–14n). Each network termination device (14a–14n) identifies MUNI asynchronous transfer mode cells (30, 32) with its unique group ID (38) for processing and ignores those MUNI asynchronous transfer mode cells (30, 32) that do not contain an appropriate group ID (38). The master network element device (12) performs traffic shaping and user parameter control functions per group to facilitate downstream quality of service guarantee per network termination device.

21 Claims, 1 Drawing Sheet

MULTIPLE USER ACCESS NETWORK

This application claims benefit to U.S. Provisional Application No. 60/045,100 filed on Apr. 25, 1997.

TECHNICAL FIELD OF THE INVENTION

The present invention relates in general to telecommunications systems and more particularly to a multiple user access network.

BACKGROUND OF THE INVENTION

The asynchronous transfer mode (ATM) protocol was designed for communication over point-to-point physical links between network elements and network terminals. Such an interface is known as the user-network interface or UNI. However, many access network topologies, including hybrid fiber coax and fiber to the curb, are based on a point-to-multipoint topology, where a shared medium link exists between a master network element and multiple slave network terminals. Such an interface is known as the multi UNI or MUNI interface. In this situation, the ATM protocol will require enhancements to support the point-to-multipoint network topology from an addressing point of view and from traffic management point of view.

There have been many proposals to deal with the addressing issue of handling ATM connections in a point-to-multipoint shared medium network topology. A first proposal is to prepend each ATM cell with a physical layer overhead containing addressing information to identify which of the multiple devices connected to an asynchronous transfer mode edge switch is the destination/source of the cell in question. However, this technique requires the development of new physical layer devices and framers to extract and generate the prepended overhead bytes from and to the standard fifty-three byte ATM cell. Moreover, this technique adds a per cell overhead that reduces the efficiency of the transmission link.

Another technique takes bits in the ATM cell header and changes them from their intended use, in a standard user to network interface or in a standard network to network interface cell protocol, in order to specify a specific terminal address on the shared medium. This technique would require the masking of bits in one direction stream and insertion of bits in another direction by an adapter device attached to the slave terminal of the master ATM edge switch. Consequently, if the virtual path identifier (VPI) and/or virtual circuit identifier (VCI) fields of the ATM cell header are used for that purpose, without a formalized set of rules for usage, then many adverse complications will emerge in the ATM signaling/meta-signaling and in ATM operations, administration, and maintenance functions due to the fact that the ATM standard has defined some well known VPI/VCI values to carry meta-signaling and OAM cells, and any non-standard manipulation VPI/VCI bits will conflict with these well known values. If the entire VPI field is used for that purpose, then the disadvantages to this technique is that a terminal can only have one virtual path (VP) and the virtual path is not seen similarly on both sides of the links, since it is being modified by an active device between the two endpoints. Consequently, the header error check field in each ATM cell is to be recalculated. No proposals have been made public that address the issues related to traffic management from a point-to-multipoint ATM link. Therefore, it is desirable to have a point-to-multipoint addressing technique that avoids using a prepended physical layer header and avoids single virtual path bit robbing found in conventional point-to-multipoint techniques.

SUMMARY OF THE INVENTION

From the foregoing, it may be appreciated that a need has arisen for providing an addressing scheme and traffic management scheme that does not adversely affect the standard operation of the ATM protocol in a MUNI topology. Moreover, it should be equally appreciated that an enhanced traffic management scheme is needed to handle the point-to-multipoint network topology. In accordance with the present invention, a multiple user access network is provided that resolves the addressing and traffic management issues associated with point-to-multipoint network topology.

According to an embodiment of the present invention, there is provided an access network that includes a network element device that interfaces with the backbone ATM network over the standard NNI interface on one side, and interfaces with a plurality of network termination devices over a point-to-point link supporting the UNI standard, or over point-to-multipoint network supporting the ATM cell format and rules described in this invention.

The present invention provides various technical advantages over previous proposals for point-to-multipoint ATM techniques. For example, one technical advantage is in generating and legitimizing a grouping concept within the ATM cell structure, rather than stealing and using bits in conflict with their intended standard use. Another technical advantage is the ability to perform traffic management junctions for each group while preserving standard asynchronous transfer mode cell layer procedures. Other technical advantages may be readily ascertained by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
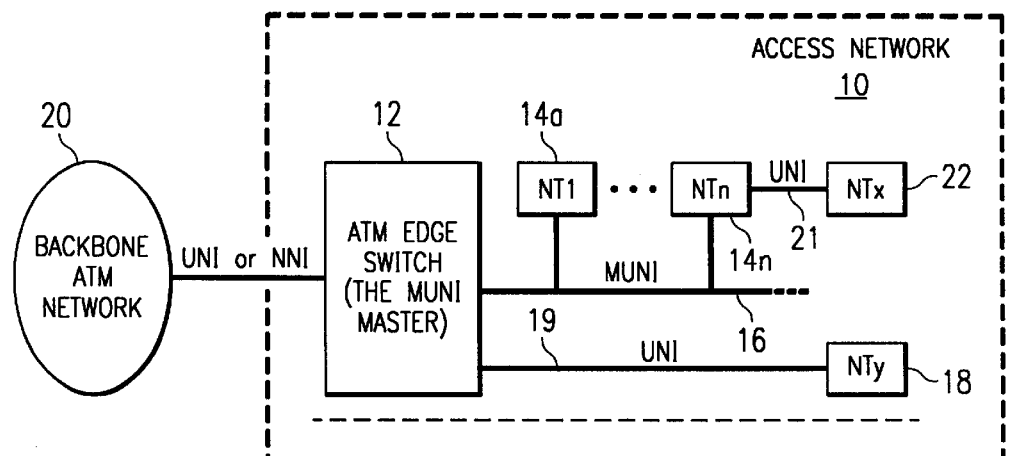
FIG. 1 illustrates a block diagram of a point-to-multipoint access network.

FIG. 1 is a block diagram of an access network 10 employing a point-to-multipoint topology. Access network 10 includes a master network element device 12, which may be an asynchronous transfer mode edge switch, and multiple slave network termination devices 14a–14n. Network element device 12 and network termination devices 14a–14n communicate over a shared media link 16 having a multi-user to network interface (MUNI) topology. Network element device 12 may also be coupled to a lone network termination device 18 in a point-to-point link 19 having a user to network interface (UNI) topology.

Network element device 12 terminates network to network interface (NNI) asynchronous transfer mode cells received from a backbone asynchronous transfer mode network 20 and carries the asynchronous transfer mode cells into one of two possible access interfaces, a UNI topology for a point-to-point link between network element device 12 and network termination device 18 or a MUNI topology for a point-to-multipoint link between network element device 12 and network termination devices 14a–14n. There may also be an end network termination device 22 having a UNI connection 21 that may exist behind the MUNI topology established by share media link 16 as shown between network termination device 14n and end network termination device 22.

In the MUNI upstream direction, where traffic flows from network termination devices 14a–14n toward backbone asynchronous transfer mode network 20, a time division multiple access technology may be used between network element device 12 and network termination devices 14a–14n. Network element device 12, acting as the master for the MUNI topology, controls and allocates upstream time slots from the slave network termination devices 14a–14n using a conventional allocation algorithm. The master network element device 12 can identify which cells belong to which slave network termination device 14a–14n based on the slot position within the upstream flow on shared media link 16. The slave network termination devices 14a–14n transmit only in their allocated time slots. Thus, using a TDMA based system, the presence of multiple devices on a shared upstream link does not create addressing or traffic problems.

Network element device 12 performs upstream arbitration of requests from network termination devices 14a–14n. Each network termination device 14a–14n issues a request for upstream bandwidth to network element device 12. When a network termination device 14a receives a bandwidth grant from network element device 12, it is required to relinquish the granted bandwidth within an upper bounded time frame. This allows for quality of service guarantees over shared media link 16 on behalf of each network termination device 14a–14n.

A two level priority scheme is preferred in order to distinguish high priority cell flows from low priority cell flows. High priority cell flows should be used for quality of service guaranteed streams, constant bit rate, variable bit rate, and streams that support minimum throughput. Network element device 12 uses an arbiter to process both bandwidth requests and priority filtering. This priority scheme approach maps easily into the two queue model that is considered to be the minimum acceptable model for providing quality of service guaranteed flows.

In a MUNI downstream direction over shared media link 16, data is broadcasted to all network termination devices 14a–14n without using such a time division multiple access scheme. Thus, a technique is needed to identify which asynchronous transfer mode cells belong to which network termination device 14a–14n to satisfy the addressing issue. Further, a procedure is needed to handle point-to-multipoint MUNI topology link management to satisfy traffic handling and operation, administration, and maintenance issues. The point-to-multipoint MUNI topology demands a well defined connection framework and a clearly defined interface with proper procedure to allow for the accurate operation of the asynchronous transfer mode protocol as a transport layer between a single master network element and multiple slave network termination devices.

Figure 2:
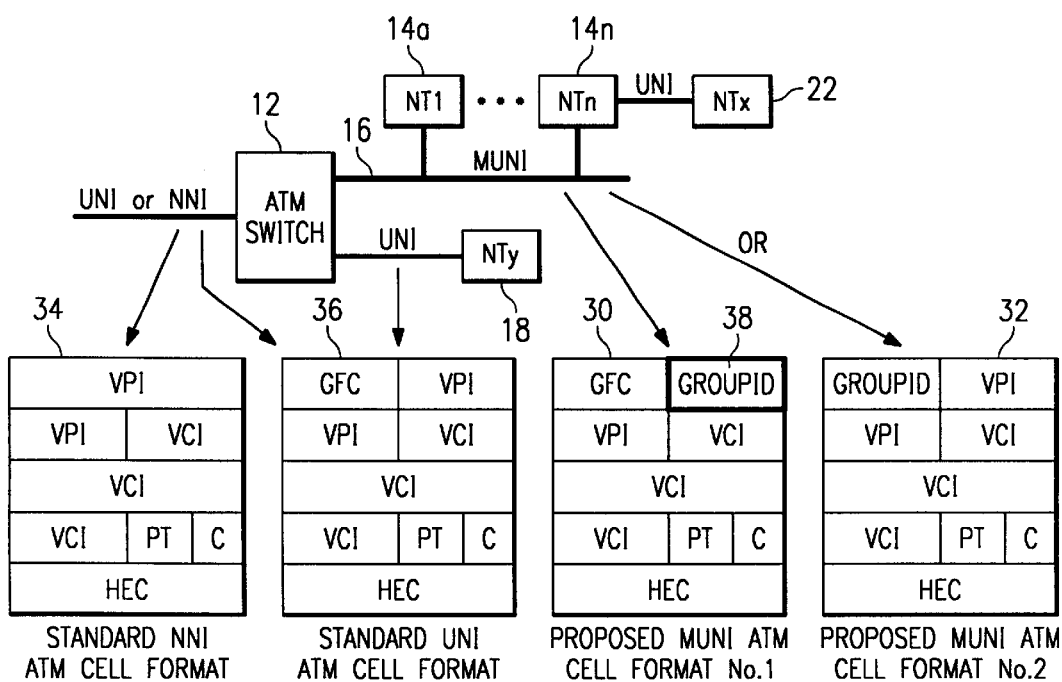
FIG. 2 illustrates a block diagram of a connection framework for the point-to-multipoint technology.

FIG. 2 is a block diagram illustrating the connection framework for a point-to-multipoint MUNI topology. A first cell example 30 and a second cell example 32 of possible MUNI asynchronous transfer mode cells are shown as compared to a standard NNI asynchronous transfer mode cell 34 and a standard UNI asynchronous transfer mode cell 36. Network element device 12, during an initial registration phase, assigns a group of bits within the header of the MUNI asynchronous transfer mode cell to become a group ID 38. The group ID 38 which may be M bits in length is formed from selected bits within the first twenty-eight bits of the header of a standard asynchronous transfer mode cell. The assignment of a group ID 38 within the cell structure of the MUNI asynchronous transfer mode cell creates a MUNI cell structure out of either the UNI or NNI cell frame structure.

Within slave devices, N different group IDs 38 will be defined including group ID(1), group ID(2), and up to group ID (n). A single group ID 38 will be associated with every slave network termination device 14a–14n. Further, one broadcast group ID 38 may be assigned by network element device 12 to allow network element device 12 to send a single broadcast message to all network termination devices 14a–14n. A preferable value for broadcast group ID 38 is all ones. The length M of a group ID 38 is under the control of network element device 12 and should be chosen to provide sufficient number of group IDs 38 to cover every slave network termination device 14a–14n on the shared media link 16 in addition to the broadcast group ID.

In order to receive a group ID 38, each network termination device 14a–14n must register with network element device 12. Any conventional registration protocol may be used, preferably requiring the network termination device 14a–14n to include its unique IEEE MAC address during the first registration request. Network element device 12 has control over the assignment of group ID's 38 values to network termination devices 14a–14n. Each network termination device 14a–14n is given one and only one group ID 38 value before it becomes active on shared media link 16. Each network termination device 14a–14n considers its group ID 38 value as its unique address over shared media link 16 in order to resolve the addressing issue.

Only MUNI asynchronous transfer mode cells that contain the group ID 38 value for a particular network termination device 14a are processed and sent to upper layers by that particular network termination device 14a. All other cells are silently ignored by that particular network termination device 14a except for cells carrying the broadcast group ID 38. Thus, any number of virtual path and virtual circuit addresses can be used for a network terminator device 14a without conflicting with similar addresses on another network termination device 14n. In this manner, a slave network termination device 14a sees a virtual UNI connection from its perspective on shared media link 16.

Bits that become the field for group ID 38 are no longer part of the previous field they belonged to. For example, if four bits were taken from the four most significant bits of the sixteen bit VCI field for use as group ID 38, then the new VCI field is now twelve bits in length. Reserved and standard assigned VCI values, such as a VCI value 5, now apply to the shorter twelve bit VCI field in a MUNI asynchronous transfer mode cell. As a result, all standard defined values for the asynchronous transfer mode protocol can be preserved.

First cell example 30 of the MUNI asynchronous transfer mode cell, resembling UNI format 36, is shown with a four bit group ID 38 field to allow for unique addressing of up to fifteen network termination devices 14a–14n over shared media link 16 with one group ID 38 value reserved for a broadcast operation. For first cell example 30, group ID 38 occupies the four most significant bits of the VPI field. For a point-to-multipoint topology, a VPI field of four bits may be adequate for meeting the needs of access network 10. The GFC, VCI, PT, and CLP fields of the MUNI asynchronous transfer mode cell of first cell example 30 are left intact to perform their respective functions. Since the header of first cell example 30 of the MUNI asynchronous transfer mode cell is not modified by any devices between network element device 12 and the slave network termination devices 14a–14n, the HEC field is valid when received and does not require recomputing. Network termination devices 14a–14n can perform their basic self filtering function on the downstream direction based on the value of the group ID 38 field. Each network termination device 14a–14n initializes its filter, after going through a registration process with master network element device 12, so that it passes only those MUNI asynchronous transfer mode cells destined for it. The group ID 38 is zeroed out for a point-to-point UNI connection 21 behind shared media link 16 to network termination device 22 unless network termination device 22 is the end point of the link.

Second cell example 32 for the MUNI asynchronous transfer mode cell resembles the NNI format 34 in that no GFC field is used. If network element device 12 is merely a multiplexer that does not perform VPI/VCI translation, then the four most significant bits of the VPI field of NNI asynchronous transfer mode cell format 34 will map exactly into the four group ID bits to leave an eight bit VPI field. This format maintains a sixteen bit VCI field and an eight bit VPI field at the expense of eliminating the GFC field. For a UNI connection 21 behind shared media link 16, group ID 38 field is zeroed out and replaced by the GFC field. For second cell example 32, group ID 38 field becomes a special type of VPI. All existing asynchronous transfer mode functions will continue to function.

Network element device 12 performs asynchronous transfer mode layer management functions per network termination device 14a–14n. This includes performing traditional asynchronous transfer mode operation, maintenance, and administrative functions, such as fault management and isolation, for in-service non-intrusive monitoring of the asynchronous transfer mode layer throughout shared media link 16. With one to one correspondence between group ID 38 values and each network termination device 14a–14n, traffic shaping per network termination device 14a–14n is available. Network element device 12 provides queuing and traffic shaping for each network termination device 14a–14n, for each virtual path, and for each virtual connection to prevent one network termination device 14a demand for bandwidth to affect quality of service of another network termination device 14n. Oversubscription of one network termination device 14a becomes possible without influencing the traffic behavior of another network termination device 14n on shared media link 16. Other enhanced shaping, monitoring, and policing schemes may be possible through the grouping concept.

Thus, it is apparent that there has been provided, in accordance with the present invention, a point-to-multipoint connection technique that satisfies the advantages set forth above. Although the present invention has been described in detail, it should be understood that various changes, substitutions, and alterations can be made herein. For example, though the group ID field has been shown to occupy certain positions within the header of an asynchronous transfer mode cell, the group ID field may be placed in other locations in order to satisfy point-to-multipoint addressing issues. Other examples may be readily ascertainable by those skilled in the art and can be made without departing from the scope of the present invention as defined by the following claims.

What is claimed is:

1. A multiple user access network, comprising:
   a network element device interfacing with a backbone ATM network; and
   a plurality of network termination devices coupled to the network element device over a shared media link;
   wherein the network element device receives cells in a first cell format, which includes a VPI field and a VCI field;
   wherein the plurality of network termination devices are operable to receive cells from the network element device in a second cell format of equal length to said first cell format, said second format including at least part of said VPI field and at least part of said VCI field; and
   wherein each cell in the second cell format has an identification field carrying an identification address to uniquely address each of the plurality of network termination devices.

2. The multiple user access network of claim 1, wherein the network element device is considered as the master for the plurality of network termination devices, the network element device having control and jurisdiction over the assignment of identification addresses to all the network termination devices on the shared media link.

3. The multiple user access network of claim 1, wherein each of the plurality of network termination devices registers with the network element device during an initialization phase to establish a corresponding identification address.

4. The multiple user access network of claim 1, wherein a particular one of the plurality of network termination devices processes only those asynchronous transfer mode cells that have an identification address in the identification field corresponding to the particular one of the plurality of network termination devices.

5. The multiple user access network of claim 4, wherein the particular one of the plurality of network termination devices ignores those ATM cells that do not have an identification address corresponding to the particular one of the plurality of network termination devices.

6. The multiple user access network of claim 1, wherein the identification field may include a broadcast identification address operable to address all of the plurality of network termination devices.

7. The multiple user access network of claim 1, wherein each of the plurality of network termination devices transfer upstream traffic carried in ATM cells in a time division multiple access scheme, each of the plurality of network termination devices being associated with a unique time slot.

8. The multiple user access network of claim 1, wherein the second cell format retains all of one of said VPI and VCI fields, and said identification field occupies part but less than all of the other of said VCI and VPI fields.

9. The multiple user access network of claim 1, wherein the second cell format retains all of both of said VPI and VCI fields.

10. A multiple user access network, comprising:
    a network element device operable to terminate NNI or UNI standard interfaces with a backbone ATM network and supporting a MUNI interface over shared media link;
    wherein cells transmitted over said NNI or UNI standard interfaces comprise a VPI field and a VCI field;
    wherein cells transmitted over said MUNI interface are of equal length to cells transmitted over said NNI or UNI standard interfaces, and include at least part of said VPI field and at least part of said VCI field;
    wherein the network element device is operable to generate an identification field for each cell transmitted over the MUNI interface, the identification field having an identification address corresponding to a subset of at least one of a plurality of network termination devices on said shared media link.

11. The multiple user access network of claim 10, wherein the network element device is operable to support a number of virtual paths and virtual circuits of the MUNI interface within any group on the shared media link.

12. The multiple user access network of claim 11, wherein virtual paths and virtual circuits of the MUNI interface are unique within a particular group, the ATM cells on the MUNI interface having virtual path identifier and virtual circuit identifier fields that are unique within a group on the shared media link.

13. The multiple user access network of claim 12, wherein similar values within the virtual path identifier and virtual circuit identifier fields of the MUNI interface may be used by different groups on the shared media link.

14. The multiple user access network of claim 10, wherein the network element device is operable to perform ATM layer management functions per network termination device group.

15. The multiple user access network of claim 10, wherein the network element device is operable to perform traffic shaping per group to prevent one network termination device from affecting the traffic behavior of another network termination device.

16. The multiple user access network of claim 10, wherein the network element device is operable to assign upstream slots for the network termination devices to facilitate upstream communication.

17. The multiple user access network of claim 16, wherein the network element device is operable to perform upstream arbitration of upstream slots to guarantee a bounded request/grant latency delay.

18. The multiple user access network of claim 10, wherein the network termination device is operable to provide downstream queuing, traffic shaping, and usage parameter controls at a group level to facilitate quality of service guarantees and traffic shaping for each network termination device on the shared media link.

19. The multiple user access network of claim 10, wherein cells transmitted over said MUNI interface retain all of one of said VPI and VCI fields, and said identification field occupies part but less than all of the other of said VCI and VPI fields.

20. The multiple user access network of claim 10, wherein cells transmitted over said MUNI interface retain all of both of said VPI and VCI fields.

21. The multiple user access network of claim 10, wherein said identification field may include a broadcast identification address operable to address all of the plurality of network termination devices.

* * * * *